Figures 5, 6, 7:
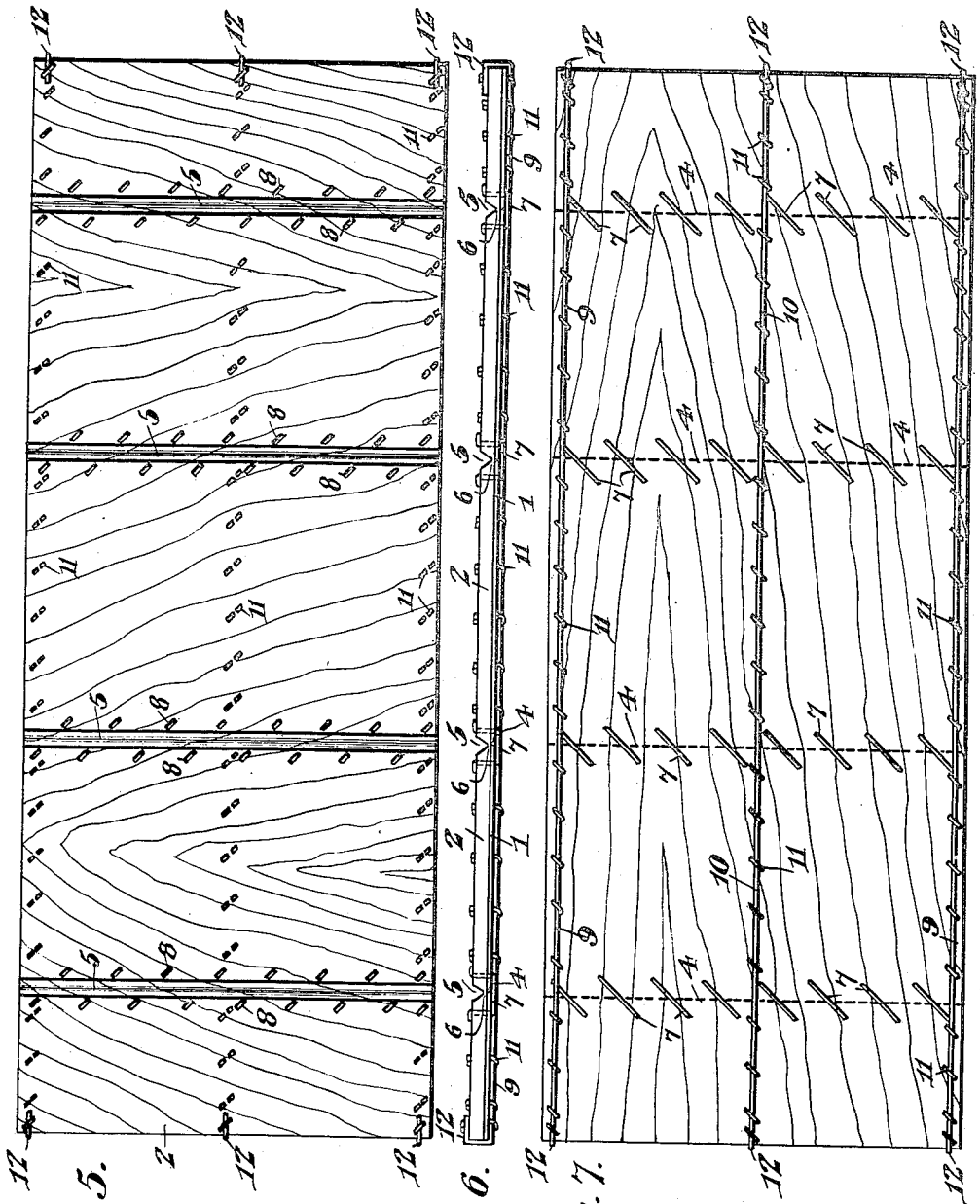

O. C. FENLASON.
VENEER BOX.
APPLICATION FILED NOV. 5, 1907.
935,748.
Patented Oct. 5, 1909.
6 SHEETS—SHEET 1.
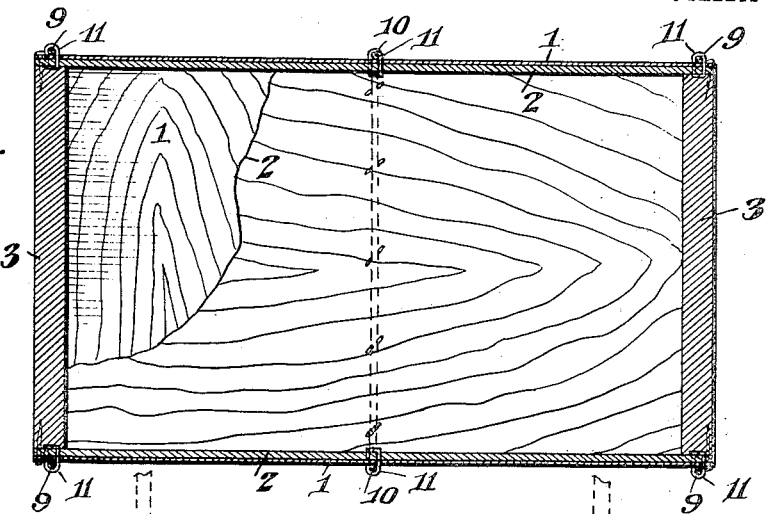
Fig. 1.
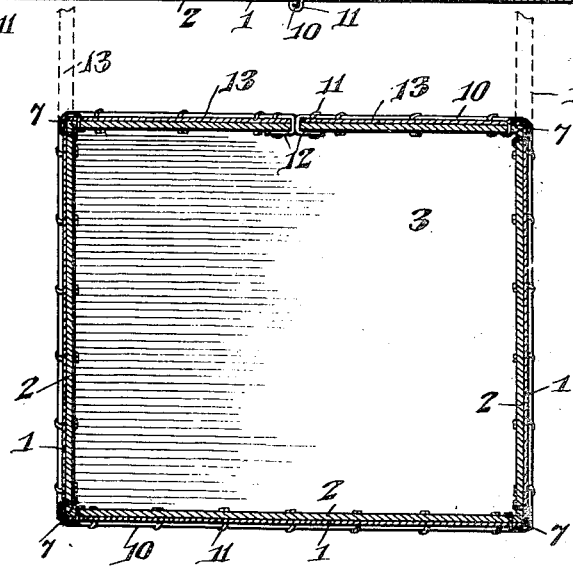
Fig. 2.
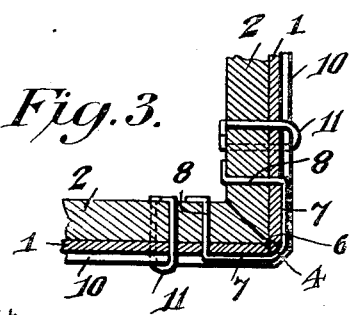
Fig. 3.
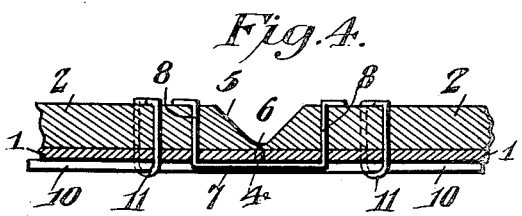
Fig. 4.
Witnesses
Jas. K. McCuthran
H. F. Riley
Orin C. Fenlason, Inventor
By
Attorney

O. C. FENLASON.
VENEER BOX.
APPLICATION FILED NOV. 5, 1907.

935,748.

Patented Oct. 5, 1909
6 SHEETS—SHEET 2.

Witnesses

Orin C. Fenlason, Inventor

By

Attorney

O. C. FENLASON.
VENEER BOX.
APPLICATION FILED NOV. 5, 1907.

935,748.

Patented Oct. 5, 1909.
6 SHEETS—SHEET 3.

Orin C. Fenlason, Inventor

Witnesses

O. C. FENLASON.
VENEER BOX.
APPLICATION FILED NOV. 5, 1907.

935,748.

Patented Oct. 5, 1909.
6 SHEETS—SHEET 4.

Witnesses
Jas. K. McCathran

Orin C. Fenlason,
Inventor
By
Attorney

O. C. FENLASON.
VENEER BOX.
APPLICATION FILED NOV. 5, 1907.
935,748.
Patented Oct. 5, 1909.
6 SHEETS—SHEET 5.
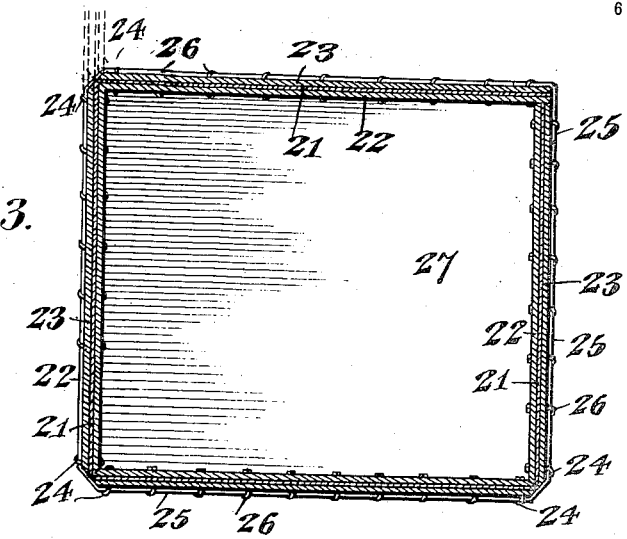
Fig. 13.
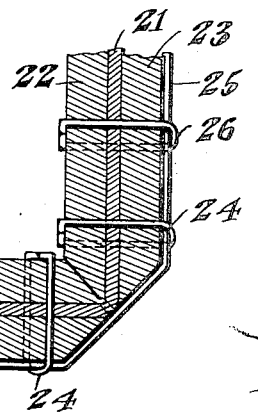
Fig. 14.
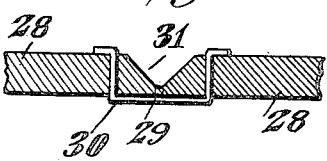
Fig. 20.
Fig. 15.
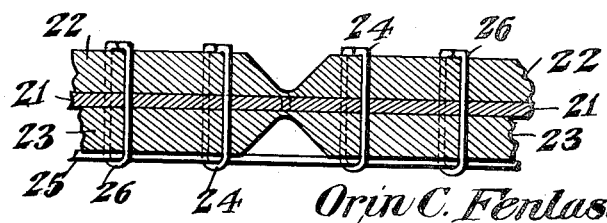
Witnesses
Jas. H. McCathran
H. F. Riley
Orin C. Fenlason, Inventor
By C. G. Siggers
Attorney O. C. FENLASON.
VENEER BOX.
APPLICATION FILED NOV. 5, 1907.
935,748.
Patented Oct. 5, 1909.
6 SHEETS—SHEET 6.
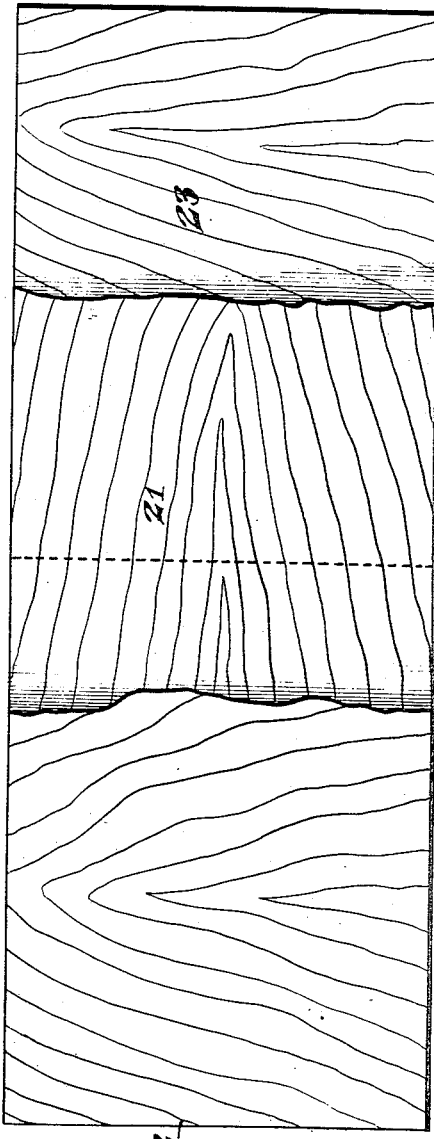
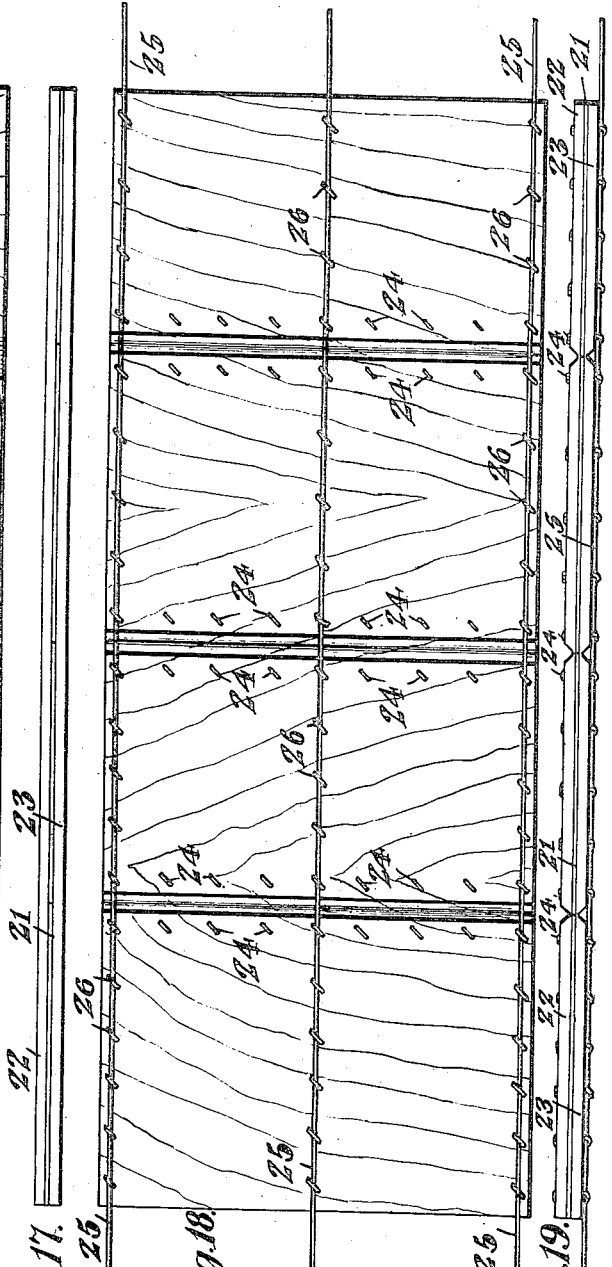

UNITED STATES PATENT OFFICE.

ORIN C. FENLASON, OF HOQUIAM, WASHINGTON.

VENEER BOX.

935,748.  Specification of Letters Patent.  Patented Oct. 5, 1909.

Application filed November 5, 1907. Serial No. 400,837.

*To all whom it may concern:*

Be it known that I, ORIN C. FENLASON, a citizen of the United States, residing at Hoquiam, in the county of Chehalis and State of Washington, have invented a new and useful Veneer Box, of which the following is a specification.

The invention relates to improvements in veneer boxes.

The object of the present invention is to improve the construction of veneer boxes, and to cheapen the process of manufacturing the same by using in the formation of the top, bottom and sides a continuous sheet of veneer, thereby avoiding the trouble, inconvenience and expense of handling separate pieces of veneer and dispensing with the mechanism for spacing such separate pieces.

A further object of the invention is to provide a veneer box in which the veneer will be effectively prevented from buckling and opening at the corners, and which will present a perfectly tight receptacle adapted for shipping loose material such as cereals, sugar, tea, etc.

Another object of the invention is to enable veneer boxes to be constructed for shipping the lighter class of merchandise, such as canned goods, etc., and to be also advantageously employed for heavier goods and the larger sizes of packages.

With these and other objects in view, the invention consists in the construction and novel combination of parts hereinafter fully described, illustrated in the accompanying drawings, and pointed out in the claims hereto appended; it being understood that various changes in the form, proportion, size and minor details of construction, within the scope of the claims, may be resorted to without departing from the spirit or sacrificing any of the advantages of the invention.

Figure 8:
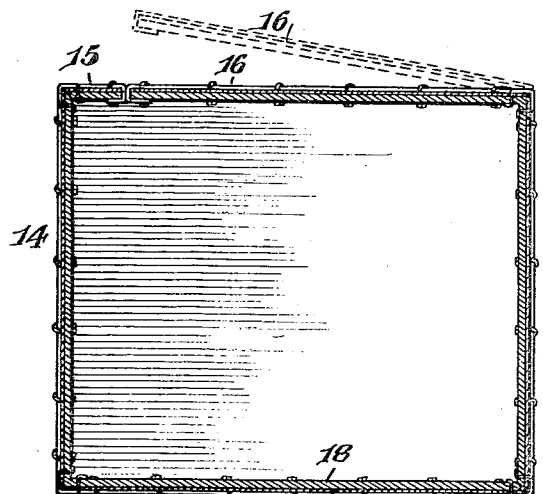
Figure 9:
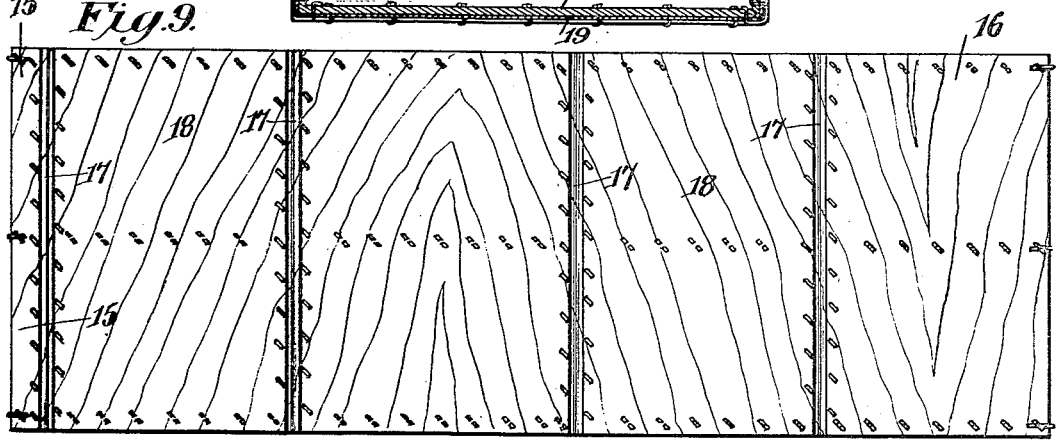
Figure 10:
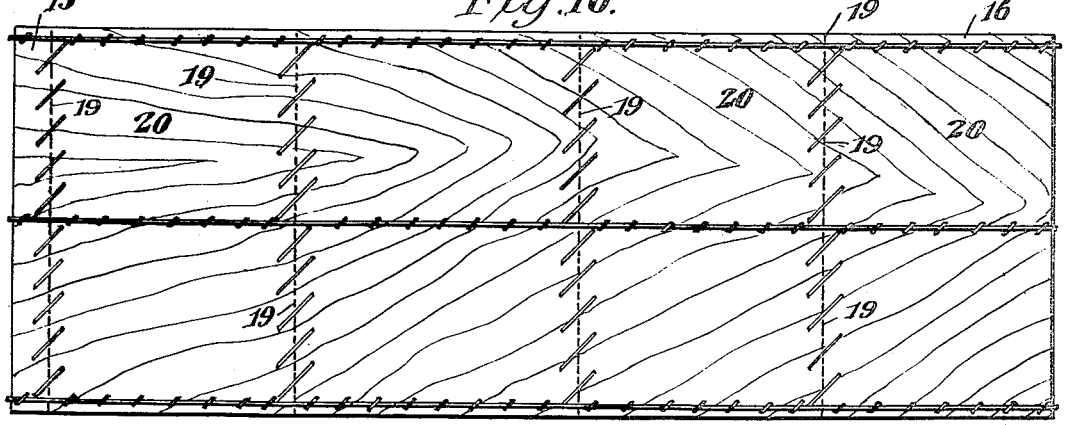
Figure 11:
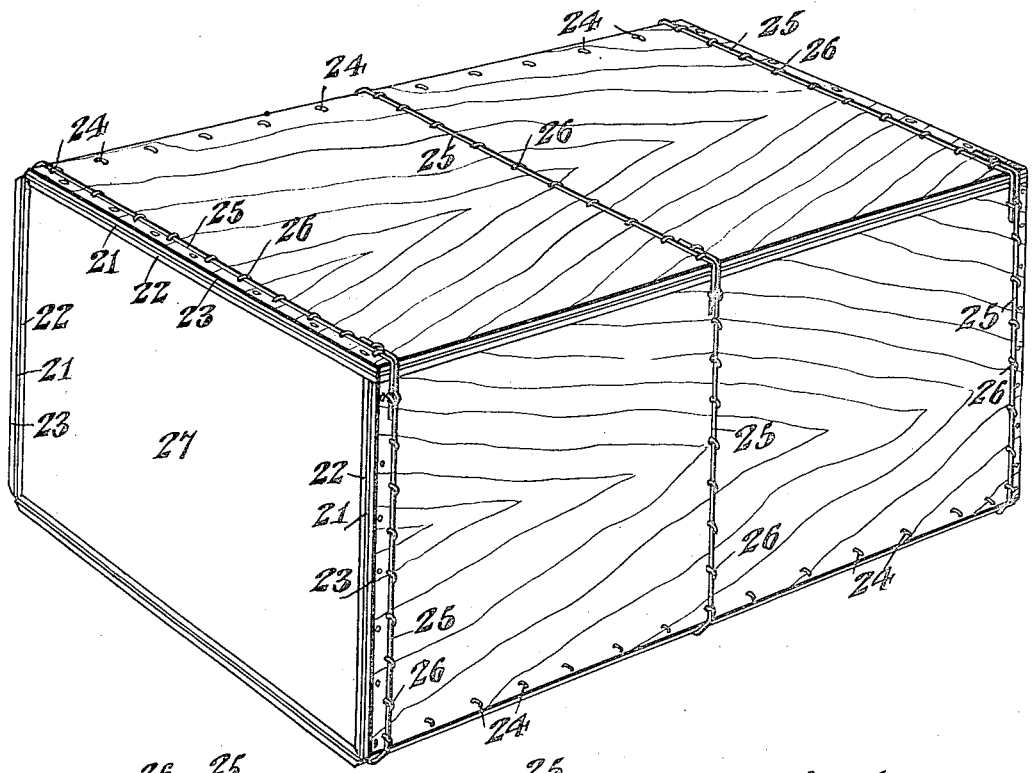
Figure 12:
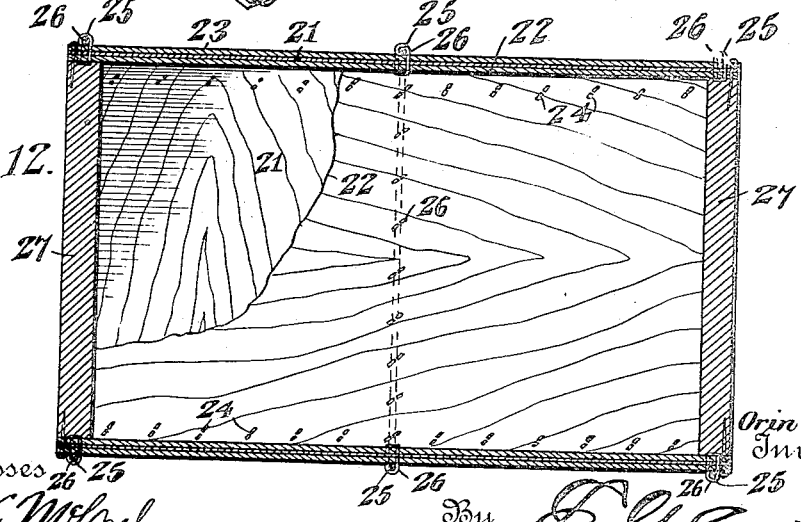

In the drawings:—Figure 1 is a longitudinal sectional view of a veneer box, constructed in accordance with this invention, the top being formed by two free end leaves or portions of the blank. Fig. 2 is a transverse sectional view of the same. Fig. 3 is an enlarged detail sectional view of one corner of the box. Fig. 4 is an enlarged detail sectional view of a portion of the blank, showing the corner portion before folding. Fig. 5 is a plan view of the blank, showing the inner faces thereof. Fig. 6 is an edge view of the blank. Fig. 7 is a plan view, showing the outer face of the blank. Fig. 8 is a transverse sectional view of a veneer box, illustrating a modification of the invention, one of the end portions of the blank being secured to the heads or ends adjacent to one side of the box, and the other end portion being free to form a hinged top or lid. Fig. 9 is a plan view of the blank, showing the inner face thereof and illustrating the arrangement of the scoring to form the fixed and free portions of the top of the box. Fig. 10 is a plan view, showing the outer face of the blank. Fig. 11 is a perspective view of a veneer box, illustrating another modification of the invention, designed for the shipment of the heavier class of merchandise. Fig. 12 is a longitudinal sectional view of the same. Fig. 13 is a transverse section view. Fig. 14 is an enlarged detail sectional view of one of the corners of the box. Fig. 15 is an enlarged detail sectional view of a portion of the blank, showing the corner before folding. Fig. 16 is a plan view of the blank before the sheets of veneer are secured together, the inner and intermediate sheets of veneer being broken away to illustrate the relative arrangement of the grain of the veneer. Fig. 17 is an edge view of the blank before the sheets of veneer are secured together. Fig. 18 is a plan view of the completed blank. Fig. 19 is an edge view of the same. Fig. 20 is a detail sectional view, showing the inner V scores and the outer roller scores applied to a single sheet of veneer.

Like numerals of reference designate corresponding parts in all the figures of the drawings.

The top, bottom and sides of the veneer box, illustrated in Figs. 1 to 4 inclusive, are formed by folding a blank, consisting of a thin outer sheet 1 of veneer and a relatively thick inner sheet 2 of veneer, the sheets being scored at the corners of the box, as hereinafter more fully explained to permit the blank to be folded around the ends or heads 3 of the box. The thin sheet 1 of veneer is roller scored, that is, it is scored by means of a roller provided with projections, which pierce the thin sheet of veneer at intervals, the scores 4 consisting of spaced perforations. Other scoring might be employed, but that just described is deemed preferable in constructing a tight box, as the perforations, as hereinafter more fully explained, are covered or closed by the thick inner sheet of veneer, when the blank is assembled in a box. The grain of the thin outer sheet of veneer, as clearly indicated in Fig. 7 of the drawings, extends longitudinally of the blank, while that of the thick inner sheet extends across or transversely of the blank. By crossing the grain of veneer, the tensile strength of the latter is arranged to sustain the weight of the contents of the receptacle whether it comes on the top, bottom or sides of the box. The thick inner sheet of veneer is provided at its inner face with V scores 5, extending from the inner face of the thick sheet to within a short distance of the thin sheet 1, so as to leave a thin connecting portion 6, which unites the several portions of the thick sheet after the same has been scored. The V score 5 has its walls or sides arranged at an angle of forty-five degrees, so as to form a miter joint, when the blank is folded around the heads or ends of the box. The perforations of the roller scores of the thin sheet of veneer permit the latter to bend at the corners, and the thin connecting portion of the thick sheet serves to close the perforations of the thin sheet. By this construction, the veneer box is perfectly tight at the corners, and is adapted for the shipment of any loose material. The two sheets of veneer are secured together at the scores 4 and 5 by means of transverse rows of wire staples 7, which are set at an angle, as clearly illustrated in Fig. 7 of the drawings, to avoid splitting the veneer. The backs of the staples extend across the scores 4 of the thin sheet 1, and the legs 8 are located beyond the V scores 5 and are clenched outwardly therefrom, as clearly illustrated in Fig. 4 of the drawings. In practice the thin sheet is roller scored before the two sheets are assembled, and the two sheets are then secured together by the staples 7, the spaced legs and the outwardly clenched terminals thereof providing the necessary space or room for the V scores, which are cut after the two sheets are secured together. When the blank is secured to the heads or ends of the box and the scored portions are bent at right angles, as illustrated in Fig. 3 of the drawings, the backs of the staples are bent substantially at right angles, and the said staples form binders for securely holding the sheets of veneer in close contact at the corners of the box, whereby the veneer is effectually prevented from buckling or otherwise separating and leaving cracks or openings. This construction secures a perfectly tight veneer box of great strength and durability. The sheets of veneer are also secured together by a plurality of longitudinal binding wires 9 and 10, located at the side edges and at the median line of the blank, and secured to the same by staples 11. The ends 12 of the binding wires are bent or looped around the edges of the veneer at the ends of the blank, the looped or bent terminals being secured by the end staples. The looping or bending of the terminals of the blank enable the binding wire to retain its tension. Although three binding wires are illustrated in the drawings, it will be readily understood that any number may be employed to secure the requisite strength. The side binding wires are arranged adjacent to the side edges of the blank in position to embrace the box at the heads or ends thereof, so that the fastening devices for securing the blank to the heads or ends will be driven through the veneer at the staples and the wires.

In assembling the parts to form the box, illustrated in Figs. 1 to 4 inclusive, the blank is secured to the lower and side edges of the ends or heads to provide a fixed bottom and rigid sides for the box, and end portions 13 of the blank, of equal size, are left clear at the top to form hinged leaves or lids, which are adapted to be swung open, as illustrated in dotted lines in Fig. 2. The free end portions of the blank are nailed, or otherwise secured to the upper edges of the ends or heads of the box to close the same, as will be readily understood.

In Figs. 8 to 10 inclusive is illustrated a modification of the invention in which the box 14 is provided with a top, composed of a narrow rigid section or portion 15 and a hinged cover or portion 16. The narrow portion 15 is rigidly secured to the upper edges of the ends of the box and, in practice, is designed to be of a width to cover one row of cans or analogous receptacles, when the box is employed for shipping such merchandise. The V scores 17 of the inner thick sheet 18 and the outer roller scores 19 of the thin outer sheet 20 are arranged to form the said narrow end portion 15 and the wide leaf or portion 16. With this exception the blank is constructed in the same manner as that heretofore described in connection with Figs. 1 to 4 inclusive of the drawings.

In Figs. 11 to 15 inclusive is illustrated a box, designed for the shipment of the heavier class of goods, such as meats, teas, etc., and adapted to be constructed for the larger sizes of packages. The blank forming the top, bottom and sides is composed of a thin intermediate sheet 21 of veneer and relatively thick inner and outer sheets 22 and 23 of veneer. The thin intermediate sheet is roller scored preparatory to assembling the sheets, and the grain of the sheet 21 extends longitudinally of the blank. The grain of the relatively thick inner and outer sheets extends transversely of the blank, so that the grain is crossed for the purpose heretofore described. The several sheets of veneer are secured together at opposite sides of the roller scores of the intermediate sheet by transverse rows of wire staples 24, the rows being arranged in pairs and being located a sufficient distance from each side of the roller scores to provide spaces for cutting the V scores of the inner and outer thick sheets, after the several sheets have been secured together by the said staples. After the thick inner and outer sheets are V scored in the manner heretofore described, longitudinal binding wires 25 are applied to the blank by means of staples 26. The binding wires, which are located at the side edges and at the median line of the blank, have extended terminals, which are stapled to the box when the lid or cover is closed. When the blank is placed around the ends or heads 27 of the box, the inner sheets of veneer form miter joints at the corners, where the blank is bent, and the thin connecting portions of the relatively thick inner sheet operate to close the perforations of the thin intermediate sheet in the manner heretofore described. The outer sheet of veneer is separated at the scoring in the application of the blank to the heads of the box, as clearly illustrated in Fig. 14 of the drawings. The scoring is arranged so that the portion, which forms the lid or cover, extends entirely across the box and overlaps the other end edge of the blank, as clearly shown in Figs. 11 and 13 of the drawings. When the top or cover is nailed down, or otherwise fastened in its closed position, the terminals 25 of the binding wires overlap and are stapled to the box.

The best results are secured by blanks made up of a plurality of thin and relatively thick sheets of veneer, but a blank may be constructed of sheets of veneer of the same thickness, and it is possible to utilize the inner miter joint forming V scores and the coöperating hinge forming roller scores in a single comparatively thick sheet of veneer, as illustrated in Fig. 20 of the drawings. The sheet 28 is provided at its outer portion with a roller score 29, extending inwardly from its outer face through a portion of its thickness. Reinforcing staples 30, similar to those heretofore described, are then applied to the veneer 28, the legs being spaced apart sufficiently to permit the V score 31 to be cut at the inner face of the sheet 28. The legs are clenched outwardly and the V score is cut to a sufficient depth to cause its apex to extend to the roller score. The veneer will then be equipped with binding wires, and when applied to the ends or heads of a box, the inner V scores will form miter joints and the outer roller scores will enable the veneer to bend without breaking. The reinforcing staples will operate as before described to form binders at the corners of the box.

Having thus fully described my invention, what I claim as new and desire to secure by Letters Patent, is:—

1. A foldable veneer box blank provided at the corners of the box with inner V scores to form miter joints and having outer roller scores consisting of rows of perforations, which are alined with the V scores, and reinforcing wire staples disposed transversely of the scores and having their legs located at opposite sides of the same and forming corner binders when the blank is applied to a box.

2. A veneer box blank comprising a plurality of sheets of veneer having their grain crossed and provided at the inner face of the blank with V scores to form miter joints and having roller scores consisting of rows of perforations and located outside the V scores and alined with the same, and wire fastenings securing the sheets together at opposite sides of the scores.

3. A flat veneer box blank foldable to form the two sides, top and bottom of the box and comprising a plurality of sheets of veneer, each scored at the corners of the box without interrupting the continuity of any one of the sheets, staples piercing the veneer at opposite sides of the scoring and securing the sheets together, and wires extending along the outside of the blank and across the exterior scoring thereof.

4. A veneer box blank comprising a plurality of sheets of veneer and including an inner sheet provided with V scores to form miter joints, an outer sheet having roller scores consisting of rows of perforations arranged in alinement with the V scores, and staples piercing the sheets of veneer at the opposite sides of the scoring and securing the sheets together and having their backs extending across the roller scoring.

5. A veneer box blank comprising a plurality of sheets of veneer and including an inner thick sheet provided with V scores to form miter joints, and a thin sheet having roller scores consisting of rows of perforations arranged in alinement with the V scores, and staples piercing the sheets of veneer at the opposite sides of the scoring and securing the sheets together and having their backs extending across the roller scoring.

6. A veneer box blank comprising a plurality of sheets of veneer and including an inner thick sheet provided with V scores to form miter joints, and a thin sheet having roller scores consisting of rows of perforations arranged in alinement with the V scores, and staples piercing the sheets of veneer at the opposite sides of the scoring and securing the sheets together and having their backs extending across the roller scoring, said staples having their ends clenched outwardly and the said V scores being cut after the staples are applied to the blank.

7. A veneer box blank comprising a plurality of sheets of veneer including a sheet having scores consisting of spaced perforations, and a separate sheet arranged at the inner face of the said sheet and provided with V scores adapted to form miter joints and leaving thin connecting portions, which cover or close the said perforations, and means for securing the sheets together.

8. A veneer box blank comprising a thin sheet of veneer provided with scores consisting of spaced perforations, and a second sheet of veneer provided with V scores and forming thin connecting portions, which cover the said perforations, and wire fastening means spanning the scores and securing the sheets of veneer together and forming corner binders when the blank is made up into a box.

9. A veneer box blank comprising a thin sheet of veneer having its grain extending longitudinally of the blank and provided with roller scores consisting of rows of perforations, a relatively thick sheet of veneer provided with V scores and having its grain disposed transversely of the blank and crossing those of the thin sheet of veneer, the rows of perforations and the V scores of the two sheets being in alinement, and staples securing the sheets together and piercing the same at opposite sides of the scoring.

10. A veneer box blank comprising a thin sheet of veneer having its grain extending longitudinally of the blank and provided with roller scores consisting of rows of perforations, a relatively thick sheet of veneer provided with V scores and having its grain disposed transversely of the blank and crossing those of the thin sheet of veneer, the rows of perforations and the V scores of the two sheets being in alinement, and staples spanning the scoring and having their backs fitted against the thin sheet of veneer, the legs of the staples piercing the sheets beyond the scoring and clenched outwardly.

11. A veneer box blank comprising a thin sheet of veneer having its grain extending longitudinally of the blank and provided with roller scores, a relatively thick sheet of veneer provided with V scores and having its grain disposed transversely of the blank and crossing that of the thin sheet of veneer, the scores of the two sheets being in alinement transverse rows of staples set at an angle to the grain of the thin sheet of veneer and spanning the scoring and having their legs piercing the veneer at opposite sides of the said scoring, and longitudinal binding wires secured to the blank.

12. A veneer box blank comprising a plurality of sheets of veneer and including an inner thick sheet provided with V scores to form miter joints, and a thin sheet having roller scores formed of spaced perforations, the scores of the sheets being in registering relation.

13. A flat veneer box blank foldable to form the two sides, top and bottom of the box and comprising a plurality of sheets of veneer each scored at the corners of the box without interrupting the continuity of any of the sheets, staples piercing the veneer at opposite sides of the scoring and securing the sheets together and forming corner binders when the blank is applied to a box, and longitudinal wires secured to the blank and extending the entire length of the same.

In testimony, that I claim the foregoing as my own, I have hereto affixed my signature in the presence of two witnesses.

ORIN C. FENLASON.

Witnesses:
  JOHN H. SIGGERS,
  DAVID R. WAGNER.